United States Patent [19]
Jameson et al.

[11] Patent Number: 6,010,592
[45] Date of Patent: *Jan. 4, 2000

[54] METHOD AND APPARATUS FOR INCREASING THE FLOW RATE OF A LIQUID THROUGH AN ORIFICE

[75] Inventors: Lee Kirby Jameson, Roswell; Lamar Heath Gipson, Acworth; Bernard Cohen, Berkeley Lake, all of Ga.

[73] Assignee: Kimberly-Clark Corporation, Neenah, Wis.

[ * ] Notice: This patent issued on a continued prosecution application filed under 37 CFR 1.53(d), and is subject to the twenty year patent term provisions of 35 U.S.C. 154(a)(2).

[21] Appl. No.: 08/477,689

[22] Filed: Jun. 7, 1995

Related U.S. Application Data

[63] Continuation-in-part of application No. 08/264,548, Jun. 23, 1994, abandoned.

[51] Int. Cl.[7] .................................................. B27G 11/02
[52] U.S. Cl. ................................ 156/379.6; 156/379.7; 156/380.6; 156/380.9; 156/381; 156/382; 425/72.2; 425/131.1; 425/133.5; 425/445; 425/464; 425/466
[58] Field of Search .................................... 264/174, 176, 264/23; 156/379.6, 379.7, 380.6, 380.9, 381, 382; 425/72.2, 131.1, 133.5, 445, 464, 466

[56] References Cited

U.S. PATENT DOCUMENTS 3,042,481 7/1962 Coggeshall .
3,619,429 11/1971 Torcgai .

FOREIGN PATENT DOCUMENTS

0202844 11/1986 European Pat. Off. .
0235603 9/1987 European Pat. Off. .
0303998 2/1989 European Pat. Off. .

*Primary Examiner*—Merrick Dixon
*Attorney, Agent, or Firm*—Karl V. Sidor

[57] ABSTRACT

An apparatus and a method for increasing the flow rate of a pressurized liquid through an orifice by applying ultrasonic energy to a portion of the pressurized liquid. The apparatus includes a die housing which defines a chamber adapted to receive a pressurized liquid and a means for applying ultrasonic energy to a portion of the pressurized liquid. The die housing further includes an inlet adapted to supply the chamber with the pressurized liquid, and an exit orifice defined by the walls of a die tip. The exit orifice is adapted to receive the pressurized liquid from the chamber and pass the liquid out of the die housing. When the means for applying ultrasonic energy is excited, it applies ultrasonic energy to the pressurized liquid without applying ultrasonic energy to the die tip. The method involves supplying a pressurized liquid to the foregoing apparatus, applying ultrasonic energy to the pressurized liquid but not the die tip while the exit orifice receives pressurized liquid from the chamber, and passing the pressurized liquid out of the exit orifice in the die tip.

18 Claims, 5 Drawing Sheets

METHOD AND APPARATUS FOR INCREASING THE FLOW RATE OF A LIQUID THROUGH AN ORIFICE

This application is a continuation-in-part of application Ser. No. 08/264,548 entitled "Method and Apparatus for Ultrasonically Assisted Melt Extrusion of Fibers" and filed in the U.S. Patent and Trademark Office on Jun. 23, 1994, now abandoned.

BACKGROUND OF THE INVENTION

The present invention relates to modifying the flow rate of a liquid through an orifice.

The melt extrusion of liquids such as, for example, thermoplastic polymers to form fibers and nonwoven webs generally involves forcing a molten polymer through a plurality of orifices to form a plurality of molten threadlines, contacting the molten threadlines with a fluid, usually air, directed so as to form filaments or fibers and attenuate them. The attenuated filaments or fibers then are randomly deposited on a surface to form a nonwoven web.

The more common and well known processes utilized for the preparation of nonwoven webs are meltblowing, coforming, and spunbonding.

Meltblowing references include, by way of example, U.S. Pat. No. 3,016,599 to Perry, Jr., U.S. Pat. No. 3,704,198 to Prentice, U.S. Pat. No. 3,755,527 to Keller et al., U.S. Pat. No. 3,849,241 to Butin et al., U.S. Pat. No. 3,978,185 to Butin et al., and U.S. Pat. No. 4,663,220 to Wisneski et al. See, also, V. A. Wente, "Superfine Thermoplastic Fibers", *Industrial and Engineering Chemistry*, Vol. 48, No. 8, pp. 1342–1346 (1956); V. A. Wente et al., "Manufacture of Superfine Organic Fibers", Navy Research Laboratory, Washington, D.C., NRL Report 4364 (111437), dated May 25, 1954, United States Department of Commerce, Office of Technical Services; and Robert R. Butin and Dwight T. Lohkamp, "Melt Blowing—A One-Step Web Process for New Nonwoven Products", *Journal of the Technical Association of the Pulp and Paper Industry*, Vol. 56, No.4, pp. 74–77 (1973).

Coforming references (i.e., references disclosing a meltblowing process in which fibers or particles are commingled with the meltblown fibers as they are formed) include U.S. Pat. No. 4,100,324 to Anderson et al. and U.S. Pat. No. 4,118,531 to Hauser.

Finally, spunbonding references include, among others, U.S. Pat. No. 3,341,394 to Kinney, U.S. Pat. No. 3,655,862 to Dorschner et al., U.S. Pat. No. 3,692,618 to Dorschner et al., U.S. Pat. No. 3,705,068 to Dobo et al., U.S. Pat. No. 3,802,817 to Matsuki et al., U.S. Pat. No. 3,853,651 to Porte, U.S. Pat. No. 4,064,605 to Akiyama et al., U.S. Pat. No. 4,091,140 to Harmon, U.S. Pat. No. 4,100,319 to Schwartz, U.S. Pat. No. 4,340,563 to Appel and Morman, U.S. Pat. No. 4,405,297 to Appel and Morman, U.S. Pat. No. 4,434,204 to Hartman et al., U.S. Pat. No. 4,627,811 to Greiser and Wagner, and U.S. Pat. No. 4,644,045 to Fowells.

Some of the difficulties or problems routinely encountered with melt extrusion processes are, by way of illustration only, thermal degradation of the polymer, plugging of extrusion dies, and limitations on fiber diameters, throughput, and production rates or line speeds. Fiber diameters generally are a function of the diameter of the orifices through which the polymer is extruded, although the temperature and velocity of the attenuating fluid can have a significant effect. For some applications, fiber diameters of less than about 10 micrometers are desired. Throughput primarily is a function of the melt flow rate of the polymer, while production rates depend in large measure upon throughput. In other words, throughput and production rates generally are dependent upon the viscosity of the molten polymer being extruded. The difficulties and problems just described result largely from efforts to manipulate melt viscosity to achieve desired throughput and/or production rates. Accordingly, there are opportunities for improvements in melt extrusion processes based on improved melt viscosity control.

SUMMARY OF THE INVENTION

The present invention addresses some of the difficulties and problems discussed above by providing an apparatus and a method for increasing the flow rate of a pressurized liquid through an orifice by applying ultrasonic energy to a portion of the pressurized liquid.

The apparatus includes a die housing which defines a chamber adapted to receive a pressurized liquid and a means for applying ultrasonic energy to a portion of the pressurized liquid. The die housing includes a chamber adapted to receive the pressurized liquid, an inlet adapted to supply the chamber with the pressurized liquid, and an exit orifice (or a plurality of exit orifices) defined by the walls of a die tip, the exit orifice being adapted to receive the pressurized liquid from the chamber and pass the liquid out of the die housing. Generally speaking, the means for applying ultrasonic energy is located within the chamber. For example, the means for applying ultrasonic energy may be an immersed ultrasonic horn. According to the invention, the means for applying ultrasonic energy is located within the chamber in a manner such that no ultrasonic energy is applied to the die tip (i.e., the walls of the die tip defining the exit orifice).

In one embodiment of the present invention, the die housing may have a first end and a second end. One end of the die housing forms a die tip having walls that define an exit orifice which is adapted to receive a pressurized liquid from the chamber and pass the pressurized liquid along a first axis. The means for applying ultrasonic energy to a portion of the pressurized liquid is an ultrasonic horn having a first end and a second end. The horn is adapted, upon excitation by ultrasonic energy, to have a node and a longitudinal mechanical excitation axis. The horn is located in the second end of the die housing in a manner such that the first end of the horn is located outside of the die housing and the second end is located inside the die housing, within the chamber, and is in close proximity to the exit orifice.

The longitudinal excitation axis of the ultrasonic horn desirably will be substantially parallel with the first axis. Furthermore, the second end of the horn desirably will have a cross-sectional area approximately the same as or greater than a minimum area which encompasses all exit orifices in the die housing. Upon excitation by ultrasonic energy, the ultrasonic horn in adapted to apply ultrasonic energy to the pressurized liquid within the chamber (defined by the die housing) but not to the die tip which has walls that define the exit orifice.

The present invention contemplates the use of an ultrasonic horn having a vibrator means coupled to the first end of the horn. The vibrator means may be a piezoelectric transducer or a magnetostrictive transducer. The transducer may be coupled directly to the horn or by means of an elongated waveguide. The elongated waveguide may have any desired input:output mechanical excitation ratio, although ratios of 1:1 and 1.5:1 are typical for many applications. The ultrasonic energy typically will have a frequency of from about 15 kHz to about 100 kHz, although other frequencies are contemplated.

In an aspect of the present invention, the exit orifice may have a diameter of less than about 0.1 inch (2.54 mm). For example, the exit orifice may have a diameter of from about 0.0001 to about 0.1 inch (0.00254 to 2.54 mm) As a further example, the exit orifice may have a diameter of from about 0.001 to about 0.01 inch (0.0254 to 0.254 mm).

According to the invention, the exit orifice may be a single exit orifice or a plurality of exit orifices. The exit orifice may be an exit capillary. The exit capillary may have a length to diameter ratio (L/D ratio) of ranging from about 4:1 to about 10:1. Of course, the exit capillary may have a L/D ratio of less than 4:1 or greater than 10:1.

In an embodiment of the invention, the exit orifice is self-cleaning. In another embodiment of the invention, the apparatus may be adapted to emulsify a pressurized multi-component liquid. In another embodiment of the invention, the apparatus may be adapted to produce a spray of liquid. For example, the apparatus may be adapted to produce an atomized spray of liquid. Alternatively and/or additionally, the apparatus may be adapted to produce a uniform, cone-shaped spray of liquid. In yet another embodiment of the invention, the apparatus may be adapted to cavitate a pressurized liquid.

The present invention encompasses a method of increasing the flow rate of a pressurized liquid through an orifice. The method involves supplying a pressurized liquid to the apparatus described above, exciting the means for applying ultrasonic energy with ultrasonic energy while the exit orifice receives pressurized liquid from the chamber (without applying ultrasonic energy to the die tip), and passing the pressurized liquid out of the exit orifice in the die tip.

According to the present invention, the flow rate of the pressurized liquid may be at least about 25 percent greater than the flow rate of an identical pressurized liquid out of an identical die housing through an identical exit orifice in the absence of excitation by ultrasonic energy. For example, the flow rate of the pressurized liquid is at least about 75 percent greater. As another example, the flow rate of the pressurized liquid is at least about 200 percent greater.

Generally speaking, the increase in flow rate of the pressurized liquid may be achieved without significant elevation in the temperature of the pressurized liquid and/or without significant elevation in the supplied pressure of the pressurized liquid.

The present invention contemplates that the method steps of exciting the means for applying ultrasonic energy with ultrasonic energy (i.e., exciting the ultrasonic horn) while the exit orifice receives pressurized liquid from the chamber and passing the liquid out of the exit orifice in the die tip may further include the step of self-cleaning the exit orifice. The present invention also contemplates that the method step of exciting the means for applying ultrasonic energy with ultrasonic energy while the exit orifice receives pressurized liquid from the chamber may further include the step of emulsifying a pressurized multi-component liquid.

The present invention contemplates that the step of passing the liquid out of the exit orifice in the die tip may further include the step of producing a spray of liquid including, but not limited to, an atomized spray of liquid and a uniform, cone-shaped spray of liquid. The present invention also contemplates that the steps of exciting the means for applying ultrasonic energy with ultrasonic energy while the exit orifice receives pressurized liquid from the chamber and passing the liquid out of the exit orifice in the die tip may further include the step of cavitating the pressurized liquid.

It is contemplated that the apparatus and method of the present invention has a very wide variety of applications where pressurized liquid is passed out of an orifice. For example, the apparatus and method may be used in fuel injectors for liquid-fueled combustors. Exemplary combustors include, but are not limited to, boilers, kilns, industrial and domestic furnaces, incinerators. The apparatus and method may be used in fuel injectors for discontinuous flow internal combustion engines (e.g., reciprocating piston gasoline and diesel engines). The apparatus and method may also be used in fuel injectors for continuous flow engines (e.g., Sterling-cycle heat engines and gas turbine engines).

The apparatus and method of the present invention may be used to emulsify multi-component liquid fuels as well as liquid fuel additives and contaminants.

The apparatus and method of the present invention may also be used to provide flow control in both open and closed circuit hydraulic systems in a variety of settings including, but not limited to, automotive, construction, industrial, agricultural and robotic.

It is also contemplated that the apparatus and method of the present invention may be used to control the phase change rate of liquid refrigerants by utilizing equipment such as, for example, ultrasonically controlled thermal expansion valves. The apparatus and method of the present invention can also provide advantages in the mass transfer and container filling operations for a variety of food products, especially food products that tend to be viscous.

The apparatus and method of the present invention can also provide advantages in spraying operations by providing a degree of control over the spray including, but not limited to, such characteristics as the droplet size, the uniformity of the droplet size, the shape of the spray pattern and/or the uniformity of the spray density.

The present invention encompasses an ultrasonic fuel injector apparatus for injection of liquid fuel into an internal combustion engine. The apparatus includes a die housing which defines a chamber adapted to receive a pressurized liquid fuel and a means for applying ultrasonic energy to a portion of the pressurized liquid fuel. The die housing includes a chamber adapted to receive the pressurized liquid fuel, an inlet adapted to supply the chamber with the pressurized liquid fuel, and an exit orifice (or a plurality of exit orifices) defined by the walls of a die tip and adapted to receive the pressurized liquid fuel from the chamber and pass the liquid fuel out of the die housing. The means for applying ultrasonic energy is located within the chamber and may be, for example, an immersed ultrasonic horn. According to the invention, the means for applying ultrasonic energy is located within the chamber in a manner such that no ultrasonic energy is applied to the die tip (i.e., the walls of the die tip defining the exit orifice).

In one embodiment of the ultrasonic fuel injector apparatus, the die housing may have a first end and a second end and the exit orifice is adapted to receive the pressurized liquid fuel from the chamber and pass the pressurized liquid fuel along a first axis. The means for applying ultrasonic energy to a portion of the pressurized liquid fuel is an ultrasonic horn having a first end and a second end. The horn is adapted, upon excitation by ultrasonic energy, to have a node and a longitudinal mechanical excitation axis. The horn is located in the second end of the die housing in a manner such that the first end of the horn is located outside of the die housing and the second end is located inside the die housing, within the chamber, and is in close proximity to the exit orifice. Alternatively, both the first end and the second end of the horn may be located inside the die housing.

The longitudinal excitation axis of the ultrasonic horn desirably will be substantially parallel with the first axis. Furthermore, the second end of the horn desirably will have a cross-sectional area approximately the same as or greater than a minimum area which encompasses all exit orifices in the die housing.

The ultrasonic fuel injector apparatus may have an ultrasonic horn having a vibrator means coupled to the first end of the horn. The vibrator means may be a piezoelectric transducer or a magnetostrictive transducer. The transducer may be coupled directly to the horn or by means of an elongated waveguide. The elongated waveguide may have any desired input:output mechanical excitation ratio, although ratios of 1:1 and 1.5:1 are typical for many applications. The ultrasonic energy typically will have a frequency of from about 15 kHz to about 100 kHz, although other frequencies are contemplated.

The present invention encompasses an apparatus and a method for the melt extrusion of a thermoplastic polymer, e.g., as fibers and nonwoven webs, utilizing ultrasonic energy to assist in the melt-extrusion process. The apparatus includes a die housing and a means for applying ultrasonic energy to a portion of the molten thermoplastic polymer. The die housing defines a chamber adapted to receive the molten thermoplastic polymer, an inlet orifice (i.e., an inlet) adapted to supply the chamber with the molten thermoplastic polymer, and an extrusion orifice (i.e., an exit orifice) adapted to receive the molten thermoplastic polymer from the chamber and extrude the polymer.

The present invention also encompasses a method of forming a fiber. The method involves supplying a molten thermoplastic polymer and extruding the polymer through an extrusion orifice (i.e., exit orifice) in a die assembly to form a threadline. The die assembly will be a die housing and a means for applying ultrasonic energy to a portion of the molten thermoplastic polymer as already defined. The means for applying ultrasonic energy may be at least partially surrounded by the molten thermoplastic polymer and is adapted to apply the ultrasonic energy to the molten thermoplastic polymer as it passes into the extrusion orifice (i.e., exit orifice). While extruding the molten thermoplastic polymer, the means for applying ultrasonic energy is excited with ultrasonic energy. The threadline which emerges from the extrusion orifice (i.e., exit orifice) then is attenuated to form a fiber.

The present invention further contemplates a method of forming from a thermoplastic polymer a fiber having entrapped along the length thereof bubbles of a gas. This method also involves supplying a molten thermoplastic polymer and extruding the polymer through an extrusion orifice (i.e., exit orifice) in a die assembly to form a threadline. The die assembly may be a die assembly and an ultrasonic horn for applying ultrasonic energy to a portion of the molten thermoplastic polymer as already defined. While extruding the molten thermoplastic polymer, the ultrasonic horn is excited with ultrasonic energy under conditions sufficient to maintain cavitation. The threadline which emerges from the extrusion orifice (i.e., exit orifice) then is attenuated to form a fiber.

Cavitation may result in the formation of gas bubbles within the molten thermoplastic polymer threadline, which bubbles remain entrapped. Attenuation to form a fiber elongates, but does not destroy, the bubbles. Because of the presence of the bubbles, the density of the fiber is less than that of an otherwise identical fiber lacking the entrapped bubbles of gas. As an example, the density of a fiber containing bubbles of a gas may be less than about 90 percent of the density of an otherwise identical fiber lacking the entrapped bubbles of gas. As another example, the density of the fiber may be in a range of from about 20 to about 90 percent of the density of an otherwise identical fiber lacking the entrapped bubbles of gas.

DETAILED DESCRIPTION OF THE INVENTION

As used herein, the term "liquid" refers to an amorphous (noncrystalline) form of matter intermediate between gases and solids, in which the molecules are much more highly concentrated than in gases, but much less concentrated than in solids. A liquid may have a single component or may be made of multiple components. The components may be other liquids, solid and/or gases. For example, Characteristic of liquids is their ability to flow as a result of an applied force. Liquids that flow immediately upon application of force and for which the rate of flow is directly proportional to the force applied are generally referred to as Newtonian liquids. Some liquids have abnormal flow response when force is applied and exhibit non-Newtonian flow properties.

As used herein, the terms "thermoplastic polymer" and "thermoplastic material" refer to a high polymer that softens when exposed to heat and returns to its original condition when cooled to room temperature. The terms are meant to include any thermoplastic polymer which is capable of being melt extruded. The term also is meant to include blends of two or more polymers and alternating, random, and block copolymers. Examples of thermoplastic polymers include, by way of illustration only, end-capped polyacetals, such as poly(oxymethylene) or polyformaldehyde, poly(trichloroacetaldehyde), poly(n-valeraldehyde), poly(acetaldehyde), poly(propionaldehyde), and the like; acrylic polymers, such as polyacrylamide, poly(acrylic acid), poly(methacrylic acid), poly(ethyl acrylate), poly(methyl methacrylate), and the like; fluorocarbon polymers, such as poly(tetrafluoroethylene), perfluorinated ethylene-propylene copolymers, ethylene-tetrafluoroethylene copolymers, poly(chlorotrifluoroethylene), ethylene-chlorotrifluoroethylene copolymers, poly(vinylidene fluoride), poly(vinyl fluoride), and the like; polyamides, such as poly(6-aminocaproic acid) or poly(-caprolactam), poly(hexamethylene adipamide), poly(hexamethylene sebacamide), poly(11-aminoundecanoic acid), and the like; polyaramides, such as poly(imino-1,3-phenyleneiminoisophthaloyl) or poly(m-phenylene isophthalamide), and the like; parylenes, such as poly-p-xylylene, poly(chloro-p-xylylene), and the like; polyaryl ethers, such as poly(oxy-2,6-dimethyl-1,4-phenylene) or poly(p-phenylene oxide), and the like; polyaryl sulfones, such as poly(oxy-1,4-phenylenesulfonyl-1,4-phenyleneoxy-1,4-phenylene-isopropylidene-1,4-phenylene), poly(sulfonyl-1,4-phenyleneoxy-1,4-phenylenesulfonyl-4,4'-biphenylene), and the like; polycarbonates, such as poly (bisphenol A) or poly(carbonyldioxy-1,4-phenyleneisopropylidene-1,4-phenylene), and the like; polyesters, such as poly(ethylene terephthalate), poly (tetramethylene terephthalate), poly(cyclohexylene-1,4-dimethylene terephthalate) or poly(oxymethylene-1,4-cyclohexylenemethyleneoxyterephthaloyl), and the like; polyaryl sulfides, such as poly(p-phenylene sulfide) or poly (thio-1,4-phenylene), and the like; polyimides, such as poly (pyromellitimido-1,4-phenylene), and the like; polyolefins, such as polyethylene, polypropylene, poly(1-butene), poly (2-butene), poly(1-pentene), poly(2-pentene), poly(3-methyl-1-pentene), poly(4-methyl-1-pentene), 1,2-poly-1,3-butadiene, 1,4-poly-1,3-butadiene, polyisoprene, polychloroprene, polyacrylonitrile, poly(vinyl acetate), poly (vinylidene chloride), polystyrene, and the like; copolymers of the foregoing, such as acrylonitrile-butadiene-styrene (ABS) copolymers, and the like; and the like.

By way of example, the thermoplastic polymer may be a polyolefin, examples of which are listed above. As a further example, the thermoplastic polymer may be a polyolefin which contains only hydrogen and carbon atoms and which is prepared by the addition polymerization of one or more unsaturated monomers. Examples of such polyolefins include, among others, polyethylene, polypropylene, poly (1-butene), poly(2-butene), poly(1-pentene), poly(2-pentene), poly(3-methyl-1-pentene), poly(4-methyl-1-pentene), 1,2-poly-1,3-butadiene, 1,4-poly-1,3-butadiene, polyisoprene, polystyrene, and the like, as well as blends of two or more such polyolefins and alternating, random, and block copolymers prepared from two or more different unsaturated monomers.

As used herein, the term "node" means the point on the longitudinal excitation axis of the ultrasonic horn at which no longitudinal motion of the horn occurs upon excitation by ultrasonic energy. The node sometimes is referred in the art, as well as in this specification, as the nodal point.

The term "close proximity" is used herein in a qualitative sense only. That is, the term is used to mean that the means for applying ultrasonic energy is sufficiently close to the exit orifice (e.g., extrusion orifice) to apply the ultrasonic energy primarily to the liquid (e.g., molten thermoplastic polymer) passing into the exit orifice (e.g., extrusion orifice). The term is not used in the sense of defining specific distances from the extrusion orifice.

As used herein, the term "melt flow rate" refers to the amount of material under a pressure or load that flows through an orifice at a given temperature over a specified period of time. The melt flow rate is expressed in units of mass divided by time (i.e., grams/10 minutes). The melt flow rate was determined by measuring the mass of molten thermoplastic polymer under a 2.160 kg load that flowed through an orifice diameter of 2.0995±0.0051 mm during a specified time period such as, for example, 10 minutes at a specified temperature such as, for example, 180° C. as determined in accordance with ASTM Test Method D1238-82, "Standard Test Method for Flow Rates of Thermoplastic By Extrusion Plastometer," using a Model VE 4-78 Extrusion Plastometer (Tinius Olsen Testing Machine Co., Willow Grove, Pa.).

As used herein, the term "consisting essentially of" does not exclude the presence of additional materials which do not significantly affect the desired characteristics of a given composition or product. Exemplary materials of this sort would include, without limitation, pigments, antioxidants, stabilizers, surfactants, waxes, flow promoters, solvents, particulates and materials added to enhance processability of the composition.

Generally speaking, the apparatus of the present invention includes a die housing and a means for applying ultrasonic energy to a portion of a pressurized liquid (e.g., a molten thermoplastic polymers, hydrocarbon oils, water, slurries, suspensions or the like). The die housing defines a chamber adapted to receive the pressurized liquid, an inlet (e.g., inlet orifice) adapted to supply the chamber with the pressurized liquid, and an exit orifice (e.g., extrusion orifice) adapted to receive the pressurized liquid from the chamber and pass the liquid out of the exit orifice of the die housing. The means for applying ultrasonic energy is located within the chamber. For example, the means for applying ultrasonic energy can be located partially within the chamber or the means for applying ultrasonic energy can be located entirely within the chamber.

Figure 1:
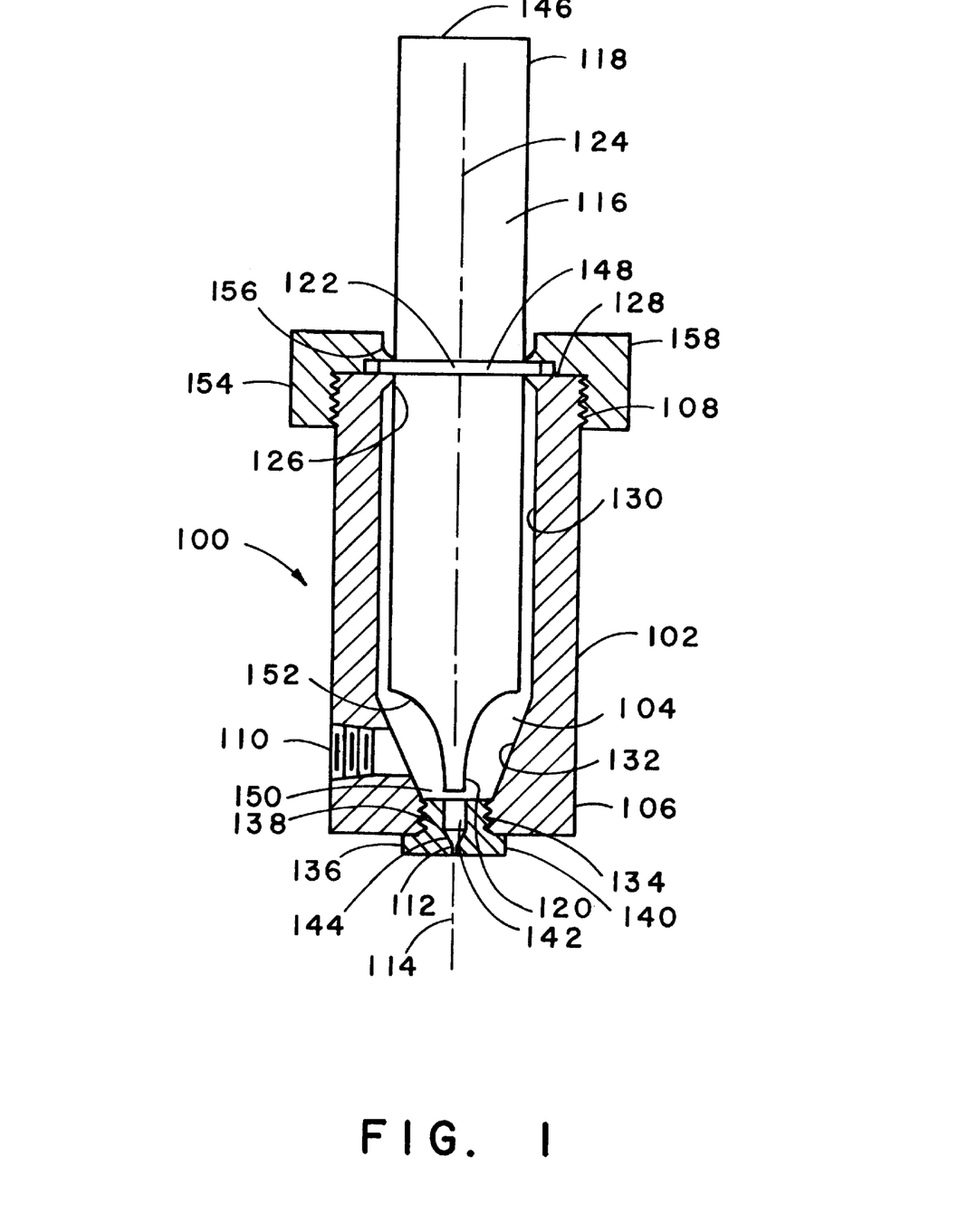
FIG. 1 is a diagrammatic cross-sectional representation of one embodiment of the apparatus of the present invention.

Referring now to FIG. 1, there is shown, not necessarily to scale, and exemplary apparatus for increasing the flow rate of a pressurized liquid through an orifice. The apparatus 100 includes a die housing 102 which defines a chamber 104 adapted to receive a pressurized liquid (e.g., oil, water, molten thermoplastic polymer, syrup or the like). The die housing 102 has a first end 106 and a second end 108. The die housing 102 also has an inlet 110 (e.g., inlet orifice) adapted to supply the chamber 104 with the pressurized liquid. An exit orifice 112 (which may also be referred to as an extrusion orifice) is located in the first end 106 of the die housing 102; it is adapted to receive the pressurized liquid from the chamber 104 and pass the liquid out of the die housing 102 along a first axis 114. An ultrasonic horn 116 is located in the second end 108 of the die housing 102. The ultrasonic horn has a first end 118 and a second end 120. The horn 116 is located in the second end 108 of the die housing 102 in a manner such that the first end 118 of the horn 116 is located outside of the die housing 102 and the second end 120 of the horn 116 is located inside the die housing 102, within the chamber 104, and is in close proximity to the exit orifice 112. The horn 116 is adapted, upon excitation by ultrasonic energy, to have a nodal point 122 and a longitudinal mechanical excitation axis 124. Desirably, the first axis 114 and the mechanical excitation axis 124 will be substantially parallel. More desirably, the first axis 114 and the mechanical excitation axis 124 will substantially coincide, as shown in FIG. 1.

The size and shape of the apparatus of the present invention can vary widely, depending, at least in part, on the number and arrangement of exit orifices (e.g., extrusion orifices) and the operating frequency of the means for applying ultrasonic energy. For example, the die housing may be cylindrical, rectangular, or any other shape. Moreover, the die housing may have a single exit orifice or a plurality of exit orifices. A plurality of exit orifices may be arranged in a pattern, including but not limited to, a linear or a circular pattern.

The means for applying ultrasonic energy is located within the chamber, typically at least partially surrounded by the pressurized liquid. Such means is adapted to apply the ultrasonic energy to the pressurized liquid as it passes into the exit orifice. Stated differently, such means is adapted to apply ultrasonic energy to a portion of the pressurized liquid in the vicinity of each exit orifice. Such means may be located completely or partially within the chamber.

When the means for applying ultrasonic energy is an ultrasonic horn, the horn conveniently extends through the die housing, such as through the first end of the housing as identified in FIG. 1. However, the present invention comprehends other configurations. For example, the horn may extend through a wall of the die housing, rather than through an end. Moreover, neither the first axis nor the longitudinal excitation axis of the horn need to be vertical. If desired, the longitudinal mechanical excitation axis of the horn may be at an angle to the first axis. Nevertheless, the longitudinal mechanical excitation axis of the ultrasonic horn desirably will be substantially parallel with the first axis. More desirably, the longitudinal mechanical excitation axis of the ultrasonic horn desirably and the first axis will substantially coincide, as shown in FIG. 1.

If desired, more than one means for applying ultrasonic energy may be located within the chamber defined by the die housing. Moreover, a single means may apply ultrasonic energy to the portion of the pressurized liquid which is in the vicinity of one or more exit orifices.

The application of ultrasonic energy to a plurality of exit orifices may be accomplished by a variety of methods. For example, with reference again to the use of an ultrasonic horn, the second end of the horn may have a cross-sectional area which is sufficiently large so as to apply ultrasonic energy to the portion of the pressurized liquid which is in the vicinity of all of the exit orifices in the die housing. In such case, the second end of the ultrasonic horn desirably will have a cross-sectional area approximately the same as or greater than a minimum area which encompasses all exit orifices in the die housing (i.e., a minimum area which is the same as or greater than the sum of the areas of the exit orifices in the die housing originating in the same chamber). Alternatively, the second end of the horn may have a plurality of protrusions, or tips, equal in number to the number of exit orifices. In this instance, the cross-sectional area of each protrusion or tip desirably will be approximately the same as or greater than the cross-sectional area of the exit orifice with which the protrusion or tip is in close proximity.

As already noted, the term "close proximity" is used herein to mean that the means for applying ultrasonic energy is sufficiently close to the exit orifice to apply the ultrasonic energy primarily to the pressurized liquid passing into the exit orifice. The actual distance of the means for applying ultrasonic energy from the exit orifice in any given situation will depend upon a number of factors, some of which are the flow rate of the pressurized liquid (e.g., the melt flow rate of a molten thermoplastic polymer or the viscosity of a liquid), the cross-sectional area of the end of the means for applying the ultrasonic energy relative to the cross-sectional area of the exit orifice, the frequency of the ultrasonic energy, the gain of the means for applying the ultrasonic energy (e.g., the magnitude of the longitudinal mechanical excitation of the means for applying ultrasonic energy), the temperature of the pressurized liquid, and the rate at which the liquid passes out of the exit orifice.

In general, the distance of the means for applying ultrasonic energy from the exit orifice in a given situation may be determined readily by one having ordinary skill in the art without undue experimentation. In practice, such distance will be in the range of from about 0.002 inch (about 0.05 mm) to about 1.3 inches (about 33 mm), although greater distances can be employed. Such distance determines the extent to which ultrasonic energy is applied to the pressurized liquid other than that which is about to enter the exit orifice; i.e., the greater the distance, the greater the amount of pressurized liquid which is subjected to ultrasonic energy. Consequently, shorter distances generally are desired in order to minimize degradation of the pressurized liquid and other adverse effects which may result from exposure of the liquid to the ultrasonic energy.

One advantage of the apparatus of the present invention is that it is self-cleaning. That is, the combination of supplied pressure and forces generated by ultrasonically exciting the means for supplying ultrasonic energy to the pressurized liquid (without applying ultrasonic energy directly to the orifice) can remove obstructions that appear to block the exit orifice (e.g., extrusion orifice). According to the invention, the exit orifice is adapted to be self-cleaning when the means for applying ultrasonic energy is excited with ultrasonic energy (without applying ultrasonic energy directly to the orifice) while the exit orifice receives pressurized liquid from the chamber and passes the liquid out of the die housing. Desirably, the means for applying ultrasonic energy is an immersed ultrasonic horn having a longitudinal mechanical excitation axis and in which the end of the horn located in the die housing nearest the orifice is in close proximity to the exit orifice but does not apply ultrasonic energy directly to the exit orifice.

The present invention encompasses a method of self-cleaning an exit orifice of a die assembly. The method includes the steps of supplying a pressurized liquid to the die assembly described above; exciting means for applying ultrasonic energy (located within the die assembly) with ultrasonic energy while the exit orifice receives pressurized liquid from the chamber without applying ultrasonic energy directly to the exit orifice; and passing the pressurized liquid out of the exit orifice in the die tip to remove obstructions that would block the exit orifice so that the exit orifice is cleaned.

An aspect of the present invention covers an apparatus for emulsifying a pressurized multi-component liquid. Generally speaking, the emulsifying apparatus has the configuration of the apparatus described above and the exit orifice is adapted to emulsify a pressurized multi-component liquid when the means for applying ultrasonic energy is excited with ultrasonic energy while the exit orifice receives pressurized multi-component liquid from the chamber. The pressurized multi-component liquid may then be passed out of the exit orifice in the die tip. The added step may enhance emulsification.

The present invention also includes a method of emulsifying a pressurized multi-component liquid. The method includes the steps of supplying a pressurized liquid to the die assembly described above; exciting means for applying ultrasonic energy (located within the die assembly) with ultrasonic energy while the exit orifice receives pressurized liquid from the chamber without applying ultrasonic energy directly to the exit orifice; and passing the liquid out of the exit orifice in the die tip so that the liquid is emulsified.

The present invention covers an apparatus for producing a spray of liquid. Generally speaking, the spray-producing apparatus has the configuration of the apparatus described above and the exit orifice is adapted to produce a spray of liquid when the means for applying ultrasonic energy is excited with ultrasonic energy while the exit orifice receives pressurized liquid from the chamber and passes the liquid out of the exit orifice in the die tip. The apparatus may be adapted to provide an atomized spray of liquid (i.e., a very fine spray or spray of very small droplets). The apparatus may be adapted to produce a uniform, cone-shaped spray of liquid. For example, the apparatus may be adapted to produce a cone-shaped spray of liquid having a relatively uniform density or distribution of droplets throughout the cone-shaped spray. Alternatively, the apparatus may be adapted to produce irregular patterns of spray and/or irregular densities or distributions of droplets throughout the cone-shaped spray.

The present invention also includes a method of producing a spray of liquid. The method includes the steps of supplying a pressurized liquid to the die assembly described above; exciting means for applying ultrasonic energy (located within the die assembly) with ultrasonic energy while the exit orifice receives pressurized liquid from the chamber without applying ultrasonic energy directly to the exit orifice; and passing the liquid out of the exit orifice in the die tip to produce a spray of liquid. According to the method of the invention, the conditions may be adjusted to produce an atomized spray of liquid, a uniform, cone-shaped spray, irregularly patterned sprays and/or sprays having irregular densities.

The present invention encompasses an apparatus for cavitating a pressurized liquid. Generally speaking, the cavitating apparatus has the configuration of the apparatus described above and is adapted to cavitate a pressurized liquid when the means for applying ultrasonic energy is excited with ultrasonic energy while the exit orifice receives pressurized liquid from the chamber and passes the liquid out of the exit orifice in the die tip.

The present invention also includes a method of cavitating a pressurized liquid. The method includes the steps of supplying a pressurized liquid to the die assembly described above; exciting means for applying ultrasonic energy (located within the die assembly) with ultrasonic energy while the exit orifice receives pressurized liquid from the chamber without applying ultrasonic energy directly to the exit orifice; and passing the pressurized liquid out of the exit orifice in the die tip so that the pressurized liquid is cavitated as it is received from the chamber and passed out of the exit orifice.

It is contemplated that the apparatus and method of the present invention has a very wide variety of applications where pressurized liquid is passed out of an orifice. For example, the apparatus and method may be used in fuel injectors for liquid-fueled combustors. Exemplary combustors include, but are not limited to, boilers, kilns, industrial and domestic furnaces, incinerators. Many of these combustors use heavy liquid fuels that may be advantageously handled by the apparatus and method of the present invention.

Internal combustion engines present other applications where the apparatus and method of the present invention may be used with fuel injectors. For example, the apparatus and method may be used in fuel injectors for discontinuous flow reciprocating piston gasoline and diesel engines. More particularly, a means for delivering ultrasonic vibrations is incorporated within a fuel injector. The vibrating element is placed so as to be in contact with the fuel as it enters an exit orifice. The vibrating element is aligned so the axis of its vibrations are parallel with the axis of the orifice. Immediately before the liquid fuel enters the exit orifice, the vibrating element in contact with the liquid fuel applies ultrasonic energy to the fuel. The vibrations appear to change the apparent viscosity and flow characteristics of the liquid fuel, resulting in an improved flow rate and/or improved atomization of the fuel stream as it enters the cylinder. The vibrations also cause breakdown and flushing out of clogging contaminants at the exit orifice. The vibrations can also cause emulsification of the liquid fuel with other components (e.g., liquid components) or additives that may be present in the fuel stream.

The apparatus and method may be used in fuel injectors for continuous flow engines such as Sterling heat engines and gas turbine engines. Such gas turbine engines may include torque reaction engines such as aircraft main and auxiliary engines, co-generation plants and other prime movers. Other gas turbine engines may include thrust reaction engines such as jet aircraft engines.

The apparatus and method of the present invention may be used to emulsify multi-component liquid fuels as well as liquid fuel additives and contaminants at the point where the liquid fuels are introduced into the combustor (e.g., internal combustion engine). For example, water entrained in certain fuels may be emulsified so that fuel/water mixture may be used in the combustor. Mixed fuels and/or fuel blends including components such as, for example, methanol, ethanol, diesel, liquid propane gas, bio-diesel or the like can also be emulsified. The present invention can have advantages in multi-fueled engines in that it may be used to compatibalize the flow rate characteristics (e.g., apparent viscosities) of the different fuels that may be used in the multi-fueled engine.

The apparatus and method of the present invention may also be used to provide flow control in both open and closed circuit hydraulic systems. Exemplary applications include, but are not limited to, automotive transmissions, power steering, shock absorbers and anti-lock braking systems; construction and agricultural equipment hydraulic systems and drives; industrial process control equipment, fluidic amplifiers and switches; and robotic hydraulic systems including, but not limited to, systems designed to provide precise pressure control via bleed-off, stepless velocity changes in driven components and shockless motion stop.

Flow enhancement of viscous liquids present other applications for the apparatus and method of the present invention. For example, the present invention may be used to enhance the flow of molten bitumens, viscous paints, hot melt adhesives, syrups, heavy oils, emulsions, slurries and suspensions and the like.

It is also contemplated that the apparatus and method of the present invention may be used to control the phase change rate of liquid refrigerants by utilizing equipment such as, for example, ultrasonically controlled thermal expansion valves.

The apparatus and method of the present invention can also provide advantages in the mass transfer and/or container filling operations for a variety of food products, especially food products that tend to be viscous. For example, it is contemplated that the present invention may be used in the simultaneous process and fill operations of food product emulsions including, but not limited to, mayonnaise, salad dressing, spreads or the like.

The apparatus and method of the present invention can also provide advantages in spraying operations such as, for example, agricultural spraying, paint spraying, snow making spray machines, spray humidifiers or the like. The present invention can provide a degree of control over the spray including, but not limited to, such characteristics as the droplet size, the uniformity of the droplet size, the shape of the spray pattern and/or the uniformity of the spray density.

As discussed above, the present invention also relates to thermoplastic polymer fibers and methods of forming a fiber from a thermoplastic polymer. The method as contemplated by the present invention first involves supplying a molten thermoplastic polymer and extruding it through an exit orifice (e.g., an extrusion orifice) in a die assembly to form a threadline. The die assembly is the apparatus already described. The means for applying ultrasonic energy is at least partially surrounded by the molten thermoplastic polymer and is adapted to apply the ultrasonic energy to the molten thermoplastic polymer as it passes into the extrusion orifice. While the molten thermoplastic polymer is being extruded, the means for applying ultrasonic energy is excited with ultrasonic energy. The extruded threadline then is attenuated to form a fiber.

In general, the process of supplying a molten thermoplastic polymer, extruding the polymer, and attenuating the threadline resulting from extruding the polymer all are carried out in accordance with procedures and practices which are well known to those having ordinary skill in the art. For example, attenuation of the threadline to form a fiber can be accomplished mechanically or by entraining the fiber in a fluid. The latter typically will be used when the fiber is to be formed into a nonwoven web. That is, formation of the fiber into a nonwoven web involves contacting the threadline with a fluid stream to attenuate the threadline and form it into a fiber. The attenuated threadline, or fiber, then is randomly deposited on a collecting surface.

Nonwoven webs also can be prepared by extruding the molten thermoplastic polymer as a continuous threadline, attenuating the threadline mechanically, gathering a plurality of attenuated threadlines into a tow, cutting the tow into staple fibers (with or without additional processing such as crimping, false twisting, or the like), and carding the staple fibers into a nonwoven web which subsequently is bonded by known means.

Under certain conditions, the application of ultrasonic energy to a portion of the thermoplastic polymer, i.e., the portion of the thermoplastic polymer passing into the extrusion orifice, can lead to the formation of bubbles of a gas in the extruded threadline. The bubbles remain as the threadline cools and, as a consequence, become entrapped. Upon attenuation of the threadline, the bubbles become extended, or stretched.

In general, the bubbles of a gas are formed in the extruded threadline under conditions which are sufficient to maintain cavitation. Cavitation is a known phenomenon which occurs in liquids in a strong ultrasonic field. In liquids, cavitation pertains to formation in a liquid of gaseous and vapor bubbles which expand and contract in response to high frequency alternating pressure of the sound field. However, the formation of bubbles in the molten thermoplastic polymer was surprising in view of the very high vapor pressure and relatively high viscosity of the molten polymer.

Cavitation of the molten thermoplastic polymer appears to be a function of the level of ultrasonic excitation and the rate of flow of the molten thermoplastic polymer into the extrusion orifice. For example, at a given rate of flow, or throughput, cavitation usually can be induced by increasing the level of ultrasonic excitation, although there typically is a flow rate above which cavitation cannot be induced.

Because of the presence of gas bubbles in the fiber, the fiber has a density which is less than that of an otherwise identical fiber lacking the entrapped bubbles of gas. For example, the density of such fiber may be less than about 90 percent of the density of an otherwise identical fiber lacking the entrapped bubbles of gas. As a further example, the density of such fiber may be in a range of from about 20 to about 90 percent of the density of an otherwise identical fiber lacking the entrapped bubbles of gas.

The present invention is further described by the examples which follow. Such examples, however, are not to be construed as limiting in any way either the spirit or the scope of the present invention. As used in the examples, the term "melt flow rate" means the melt flow rate as measured in accordance with ASTM Method D-1238. The term "flow rate" is used to identify the experimentally determined rate of flow of pressurized liquid (e.g., molten thermoplastic polymer, oil, or the like) through an exit orifice (e.g., extrusion orifice) in an apparatus of the present invention.

EXAMPLE 1

The polymer employed was a polypropylene having a melt flow rate of 400 grams per 10 minutes, or g/10 min. (Himont HH-441, Himont Company, Wilmington, Del.) having no melt processing additives. The polymer was melted in a constant pressure batch extruder manufactured by Alex James and Associates, Greenville, S.C. The principal components of the extruder consisted of a pressure barrel, approximately 3 inches (about 80 mm) in length with an axial bore of 1.0 inch (about 25 mm) diameter. A pressurizing piston of 1.0 inch (about 25 mm) diameter and approximately 4 inches (about 100 mm) in length was fitted into the end of the barrel and sealed by a packing gland. The opposite end of the barrel was fitted with a flange secured by bolts which accommodated a filter and seal, and provided a means for connecting piping to the outlet of the barrel assembly. In operation, the barrel assembly was heated by clamping it within a jacket of imbedded cartridge heaters. The barrel temperature was sensed by a thermocouple that was in contact with the outer surface of the barrel. The molten charge in the barrel was pressurized by forcing the piston into the barrel. This force was provided by a hydraulic ram. System pressure was monitored by a pressure gauge on the hydraulic line to the ram.

As the piston was forced into the reservoir under constant pressure, molten polymer exited through an outlet in the other end of the reservoir into an approximately 4-inch (about 10-cm) length of ¼-inch (about 6.4-mm) diameter stainless steel tubing. The tubing was connected to the inlet (e.g., inlet orifice) of an apparatus of the present invention as shown in FIG. 1.

Again with reference to FIG. 1, the die housing 102 of the apparatus was a cylinder having an outer diameter of 1.375 inches (about 34.9 mm), an inner diameter of 0.875 inch (about 22.2 mm), and a length of 3.086 inches (about 78.4 mm). The outer 0.312-inch (about 7.9-mm) portion of the second end 108 of the die housing was threaded with 16-pitch threads. The inside of the second end had a beveled edge 126, or chamfer, extending from the face 128 of the second end toward the first end 106 a distance of 0.125 inch (about 3.2 mm). The chamfer reduced the inner diameter of the die housing at the face of the second end to 0.75 inch (about 19.0 mm). An inlet 110 (also called an inlet orifice) was drilled in the die housing, the center of which was 0.688 inch (about 17.5 mm) from the first end, and tapped. The inner wall of the die housing consisted of a cylindrical portion 130 and a conical frustrum portion 132. The cylindrical portion extended from the chamfer at the second end toward the first end to within 0.992 inch (about 25.2 mm) from the face of the first end. The conical frustrum portion extended from the cylindrical portion a distance of 0.625 inch (about 15.9 mm), terminating at a threaded opening 134 in the first end. The diameter of the threaded opening was 0.375 inch (about 9.5 mm); such opening was 0.367 inch (about 9.3 mm) in length.

A die tip 136 was located in the threaded opening of the first end. The die tip consisted of a threaded cylinder 138 having a circular shoulder portion 140. The shoulder portion was 0.125 inch (about 3.2 mm) thick and had two parallel faces (not shown) 0.5 inch (about 12.7 mm) apart. An exit orifice 112 (also called an extrusion orifice) was drilled in the shoulder portion and extended toward the threaded portion a distance of 0.087 inch (about 2.2 mm). The diameter of the extrusion orifice was 0.0145 inch (about 0.37 mm). The extrusion orifice terminated within the die tip at a vestibular portion 142 having a diameter of 0.125 inch (about 3.2 mm) and a conical frustrum portion 144 which joined the vestibular portion with the extrusion orifice. The wall of the conical frustrum portion was at an angle of 30° from the vertical. The vestibular portion extended from the extrusion orifice to the end of the threaded portion of the die tip, thereby connecting the chamber defined by the die housing with the extrusion orifice.

The means for applying ultrasonic energy was a cylindrical ultrasonic horn 116. The horn was machined to resonate at a frequency of 20 kHz. The horn had a length of 5.198 inches (about 132.0 mm), which was equal to one-half of the resonating wavelength, and a diameter of 0.75 inch (about 19.0 mm). The face 146 of the first end 118 of the horn was drilled and tapped for a ⅜-inch (about 9.5-mm) stud (not shown). The horn was machined with a collar 148 at the nodal point 122. The collar was 0.094-inch (about 2.4-mm) wide and extended outwardly from the cylindrical surface of the horn 0.062 inch (about 1.6 mm). Thus, the diameter of the horn at the collar was 0.875 inch (about 22.2 mm). The second end 120 of the horn terminated in a small cylindrical tip 150 0.125 inch (about 3.2 mm) long and 0.125 inch (about 3.2 mm) in diameter. Such tip was separated from the cylindrical body of the horn by a parabolic frustrum portion 152 approximately 0.5 inch (about 13 mm) in length. That is, the curve of this frustrum portion as seen in cross-section was parabolic in shape. The face of the small cylindrical tip was normal to the cylindrical wall of the horn and was located about 0.4 inch (about 10 mm) from the extrusion orifice. Thus, the face of the tip of the horn, i.e., the second end of the horn, was located immediately above the vestibular opening in the threaded end of the die tip.

The first end 108 of the die housing was sealed by a threaded cap 154 which also served to hold the ultrasonic horn in place. The threads extended upwardly toward the top of the cap a distance of 0.312 inch (about 7.9 mm). The outside diameter of the cap was 2.00 inches (about 50.8 mm) and the length or thickness of the cap was 0.531 inch (about 13.5 mm). The opening in the cap was sized to accommodate the horn; that is, the opening had a diameter of 0.75 inch (about 19.0 mm). The edge of the opening in the cap was a chamfer 156 which was the mirror image of the chamfer at the second end of the die housing. The thickness of the cap at the chamfer was 0.125 inch (about 3.2 mm), which left a space between the end of the threads and the bottom of the chamfer of 0.094 inch (about 2.4 mm), which space was the same as the length of the collar on the horn. The diameter of such space was 1.104 inch (about 28.0 mm). The top 158 of the cap had drilled in it four ¼-inch diameter×¼-inch deep holes (not shown) at 90° intervals to accommodate a pin spanner. Thus, the collar of the horn was compressed between the two chamfers upon tightening the cap, thereby sealing the chamber defined by the die housing.

A Branson elongated aluminum waveguide having an input:output mechanical excitation ratio of 1:1.5 was coupled to the ultrasonic horn by means of a ⅜-inch (about 9.5-mm) stud. To the elongated waveguide was coupled a piezoelectric transducer, a Branson Model 502 Converter, which was powered by a Branson Model 1120 Power Supply operating at 20 kHz (Branson Sonic Power Company, Danbury, Conn.). Power consumption was monitored with a Branson Model A410A Wattmeter.

The stainless steel tubing leading from the reservoir to the die housing and the die housing itself were wrapped with flexible heating tape which secured a thermocouple to each of the tubing and die housing. The reservoir was maintained at a temperature of about 177° C. and the tubing and the die housing were maintained at a temperatures of approximately 190° C. and 260° C., respectively. The temperature of the die tip was about 190° C., as measured with a hand-held pyrometer, a Digi-Sense Type K Digital Thermometer (Cole-Parmer Instrument Company, Niles, Ill.); the temperature of the extruded polymer was found to be about 249° C. A hydraulic pressure of 150 pounds per square inch, gauge (psig) then was applied by the hydraulic ram to the piston. When the flow of molten polymer from the extrusion orifice started, a two-minute mass sample was collected in a tared aluminum sampling pan held about 2 inches (about 5 cm) below the die tip. The sampling pan was reweighed and the flow rate of extruded polymer in grams per minute (g/min.) was calculated. Ultrasonic power then was turned on with the power setting at 100 percent, resulting in an output load of 80 watts. A sample was taken and the flow rate calculated, as before.

When the power to the horn was off, the flow rate was 0.05 g/min. With 100 percent power being applied to the horn the flow rate was 0.345 g/min., even though the extrusion pressure was constant during both experiments. At the same extrusion pressure, the flow rate was increased about 7-fold by the application of ultrasonic energy in accordance with the present invention.

Figure 2:
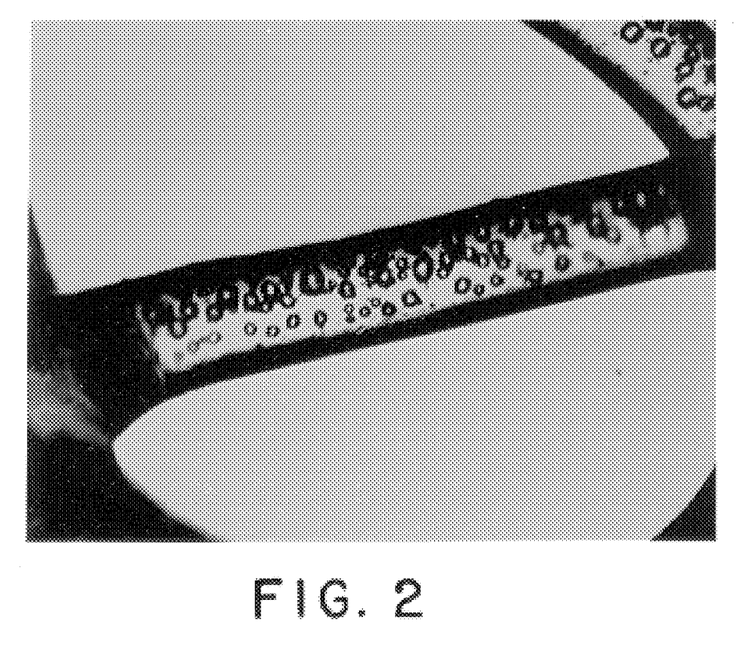
FIGS. 2 and 3 are photomicrographs of fibers prepared in accordance with one embodiment of the method of the present invention, which fibers have bubbles of a gas entrapped therein.
Figure 3:
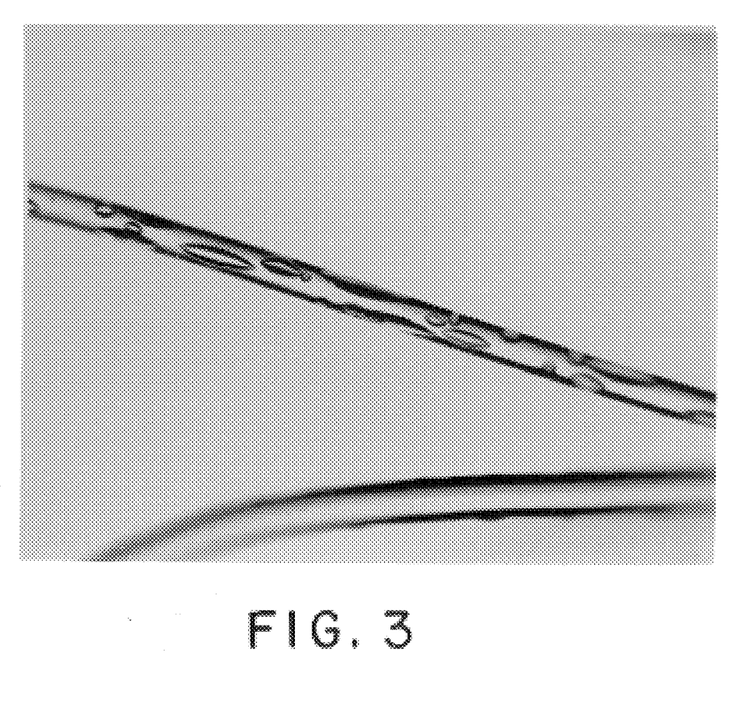

While taking the sample with ultrasonic power applied, it was noted that the reading of the wattmeter was slightly unstable and that changes in the audible harmonics emanating from the horn seemed to match the pattern of power variation. These observations indicated that the extremely low flow rate was allowing cavitation to occur at the horn/polymer interface. Subsequent microscopic examination of the extruded fiber gathered in the sample cup revealed the presence of bubbles within the fiber, evidently formed by the cavitation extraction of gas from the melt. A photomicrograph of the fiber is shown in FIG. 2. In addition, fibers formed under the influence of the ultrasound and drawn by gravity were gathered from a catch pan located approximately 4 feet (about 1.2 meters) below the die tip. A photomicrograph of these fibers, shown in FIG. 3, shows the bubbles entrained within these fibers have been elongated to several times their diameters.

EXAMPLE 2

The procedure of Example 1 was repeated, except that the polymer employed was a polypropylene having a melt flow rate of 30 g/10 min. (Escorene PP-3445, Exxon Chemical Americas, Houston, Tex. 77079) and lacking melt processing additives, and the elongated waveguide was replaced with one having an input:output mechanical excitation ratio of 1:1. In addition, precision hydraulic and pneumatic gauges, as well as a precision air pressure regulator, were added to the extrusion system. Also, a ¼-inch (about 6.4-mm) thick layer of rigid mineral insulation board was attached to the die tip to minimize heat loss.

Six trials were run, with conditions and results being summarized in Table 1. In the table, the "Pressure" column is the hydraulic pressure in psig as described in Example 1, the "Temp." column identifies the temperature of each of the extruder, pipe, and die housing in degrees Celsius as described in Example 1, the "Percent" column under the "Power" heading refers to the percentage of maximum ultrasonic power being applied to the horn, the "Watts" column under the "Power" heading refers to power consumption at a given power setting, and the "Rate" column refers to the flow rate measured for each trial, expressed in g/min.

TABLE 1

Summary of Trials with Escorene PP-3445

| Trial | Pressure | Temp. | Percent | Power Watts | Rate |
|---|---|---|---|---|---|
| 1 | 150 | 249 | 0 | 0 | 1.62 |
|   |     |     | 50 | 50 | 1.90 |
|   |     |     | 100 | 80 | 3.50 |
| 2 | 150 | 232 | 0 | 0 | 1.16 |
|   |     |     | 50 | 50 | 1.38 |
|   |     |     | 100 | 80 | 1.74[a] |
| 3 | 150 | 221 | 0 | 0 | 0.44 |
|   |     |     | 50 | 50 | 0.59[a] |
|   |     |     | 100 | 80 | 0.60 |
| 4 | 200 | 221 | 0 | 0 | 2.18 |
|   |     |     | 50 | 45 | 2.64[a] |
|   |     |     | 100 | 80 | 4.14[a] |
| 5 | 200 | 232 | 0 | 0 | 1.24 |
|   |     |     | 50 | 45 | 2.50 |
|   |     |     | 100 | 80 | 3.50[a] |
| 6 | 200 | 249 | 0 | 0 | 1.35 |
|   |     |     | 50 | 45 | 2.63 |
|   |     |     | 100 | 80 | 4.35 |

[a]Cavitation and stream disruption (bubble formation).

Because each trial required dismantling the extruder to load the reservoir with polymer, it was difficult to reassemble the extruder without introducing some variations in the tightness of the piston packing gland, the fit of the piston in the barrel, the wrapping of the stainless steel tubing and the die housing with the heating tape, and manual control of the tubing and die housing temperatures. Such variables, as well as others, preclude a rigorous comparison of one trial with another. However, trends within each trial, as well as general trial-to-trial observations, are meaningful.

It is evident that the application of ultrasonic energy increases the flow rate of molten polymer through the extrusion orifice, regardless of extrusion pressure or temperature. The extent of the improvement appears to be a function of both extrusion pressure and temperature. In other words, increasing either pressure or temperature increases flow rate, although the effect of pressure appears to be greater.

EXAMPLE 3

In this example, the constant pressure batch extruder employed in the previous two examples was replaced with a Grid Melter, Model GM-25-1, obtained from J&M Laboratories Inc. of Dawsonville, Ga. The device has the capability to process up to 25 pounds of polymer per hour (about 11 kilograms per hour), and has an integral variable speed gear pump with a displacement of 1.752 cc/revolution. Temperature of the melt is regulated in two zones, premelt and main melt. Pressure is limited and regulated by an internal variable by-pass valve, and indicated by digital readout resolved to increments of 10 psi. Pump drive speed is controlled by a panel mounted potentiometer.

The Grid Melter was used to melt and pressurize the polymers. It eliminated the need for dismantling equipment between trials as required in previous examples. The first polymer used was the Escorene PP-3445 (Trials 1–18, inclusive) and the second was the Himont HH-441 (Trials 19–42, inclusive). Pump drive speed was arbitrarily set at approximately 30 percent of the potentiometer range, and pressure was set and controlled by adjusting the by-pass valve. A 9-inch (about 23-cm) length of ¼-inch (about 6.4-mm) diameter stainless steel tubing was attached from the outlet of the Grid Melter to the inlet of the die housing. The tubing and the extrusion cup were wrapped with heat tape as two zones, and the two zones were set and controlled by automatic heat controllers. All heat zones in both the grid melter and the extrusion apparatus were set to the same point. In addition, the pressure of the Grid Melter was set only at the beginning of each series of trials. The results of the trials are summarized in Tables 2 and 3. In the tables, the "Pressure" column is the Grid Melter pressure in psig, the "Temp." column identifies the temperature set point in degrees Celsius of all heating zones, the "Percent" column under the "Power" heading refers to the percentage of maximum ultrasonic power being applied to the horn, the "Watts" column under the "Power" heading refers to power consumption at a given power setting, and the "Rate" column refers to the flow rate measured for each trial, expressed in g/min.

TABLE 2

Summary of Trials with Escorene PP-3445

| Trial | Pressure | Temp. | Percent | Power Watts | Rate |
|---|---|---|---|---|---|
| 1 | 350[a] | 188 | 0 | 0 | 0.76 |
| 2 | 350 | 188 | 30 | 40 | 1.66 |
| 3 | 340 | 188 | 40 | 50 | 2.08 |
| 4 | 340 | 194 | 0 | 0 | 0.76 |
| 5 | 340 | 194 | 30 | 40 | 1.56 |
| 6 | 340 | 194 | 40 | 50 | 2.01 |
| 7 | 350 | 182 | 0 | 0 | 0.68 |
| 8 | 350 | 182 | 30 | 40 | 1.38 |
| 9 | 340 | 182 | 40 | 50 | 1.85 |
| 10 | 420[a] | 182 | 0 | 0 | 0.97 |
| 11 | 420 | 182 | 30 | 38 | 1.78 |
| 12 | 410 | 182 | 40 | 50 | 2.29 |
| 13 | 410 | 188 | 0 | 0 | 1.02 |
| 14 | 400 | 188 | 30 | 40 | 1.84 |
| 15 | 400 | 188 | 40 | 50 | 2.36 |
| 16 | 400 | 194 | 0 | 0 | 1.06 |
| 17 | 390 | 194 | 30 | 40 | 1.96 |
| 18 | 380 | 194 | 40 | 50 | 2.40 |

[a]Initial pressure setting of the Grid Melter.

TABLE 3

Summary of Trials with Himont HH-441

| Trial | Pressure | Temp. | Percent | Power Watts | Rate |
|---|---|---|---|---|---|
| 19 | 360[a] | 177 | 0 | 0 | 1.69 |
| 20 | 360 | 177 | 40 | 50 | 3.33 |
| 21 | 340 | 177 | 70 | 75 | 4.69 |
| 22 | 330 | 182 | 0 | 0 | 1.51 |
| 23 | 330 | 182 | 44 | 50 | 3.16 |
| 24 | 320 | 182 | 70 | 75 | 4.75 |
| 25 | 340 | 188 | 0 | 0 | 1.81 |
| 26 | 330 | 188 | 40 | 50 | 3.53 |
| 27 | 320 | 188 | 70 | 75 | 4.93 |
| 28 | 340 | 194 | 0 | 0 | 1.96 |
| 29 | 320 | 194 | 40 | 50 | 3.95 |
| 30 | 310 | 194 | 70 | 75 | 5.14 |
| 31 | 500[a] | 177 | 0 | 0 | 3.42 |
| 32 | 510 | 177 | 40 | 53 | 5.42 |
| 33 | 510 | 177 | 70 | 75 | 7.33 |
| 34 | 500 | 182 | 0 | 0 | 3.96 |
| 35 | 510 | 182 | 40 | 50 | 6.17 |
| 36 | 460 | 182 | 70 | 70 | 7.85 |
| 37 | 500 | 188 | 0 | 0 | 4.47 |

TABLE 3-continued

Summary of Trials with Himont HH-441

| Trial | Pressure | Temp. | Percent | Power Watts | Rate |
|---|---|---|---|---|---|
| 38 | 490 | 188 | 40 | 50 | 6.72 |
| 39 | 490 | 188 | 70 | 72 | 9.11 |
| 40 | 510 | 194 | 0 | 0 | 5.51 |
| 41 | 500 | 194 | 40 | 50 | 7.99 |
| 42 | 490 | 194 | 70 | 72 | 10.41 |

[a]Initial pressure setting of the Grid Melter.

Figure 4:
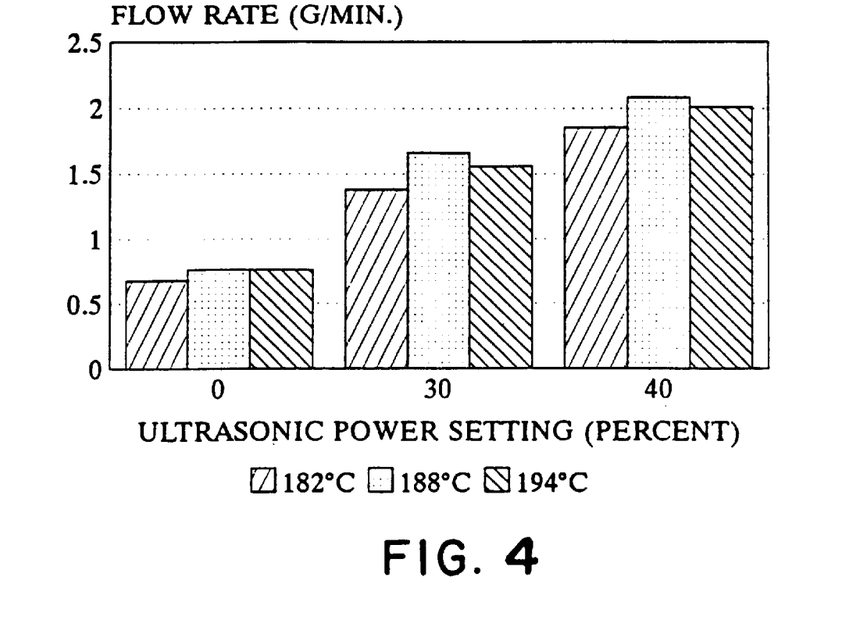
FIGS. 4–8 are plots of polymer flow rates through an orifice at various temperatures without the application of ultrasonic energy and with the application of ultrasonic energy at two different power levels.
Figure 5:
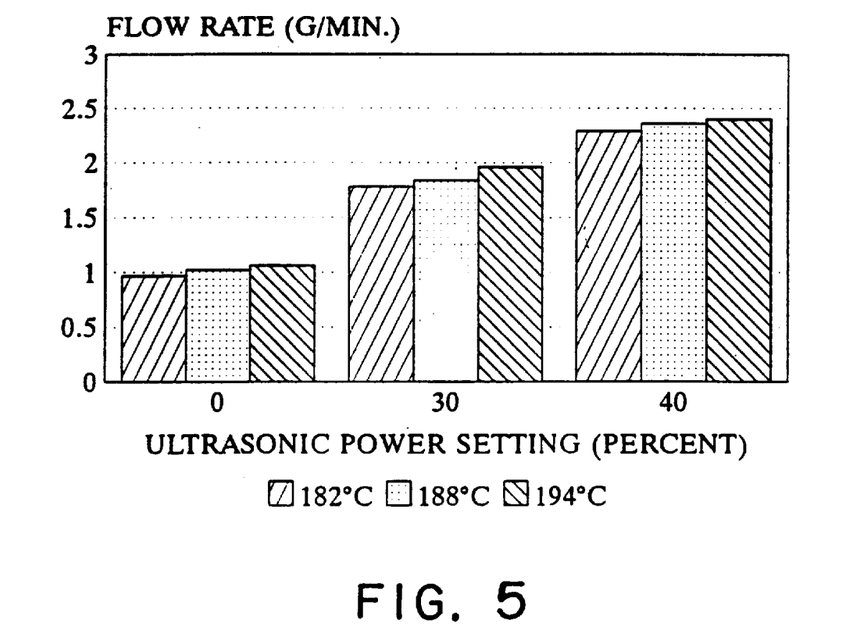
Figure 6:
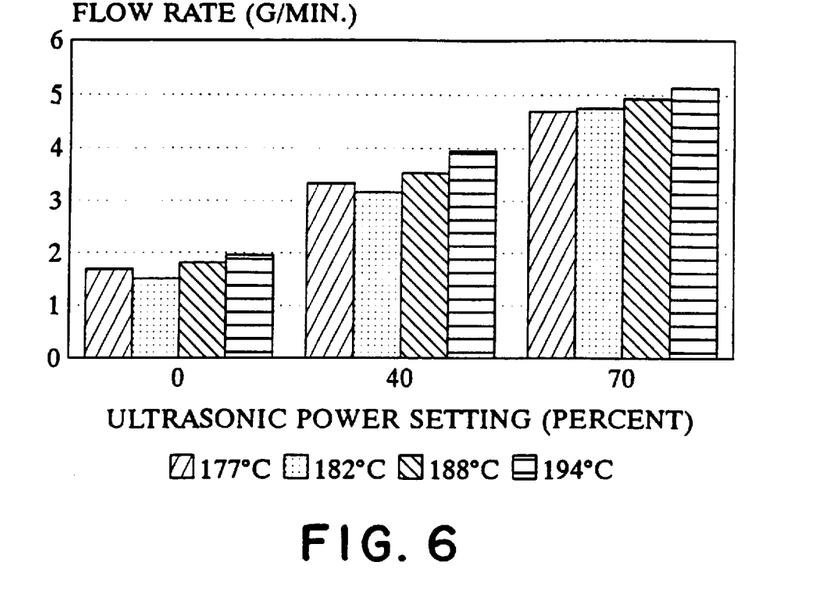
Figure 7:
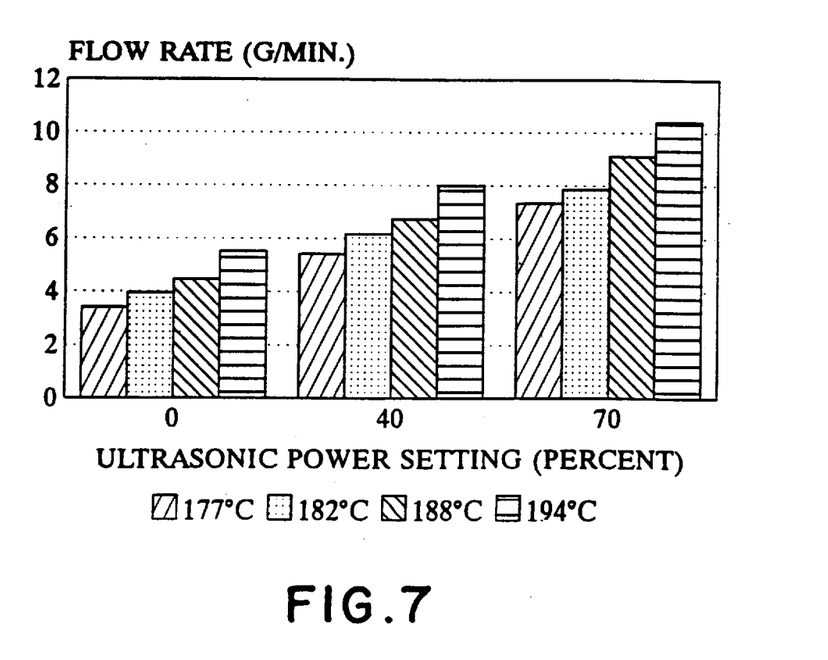
Figure 8:
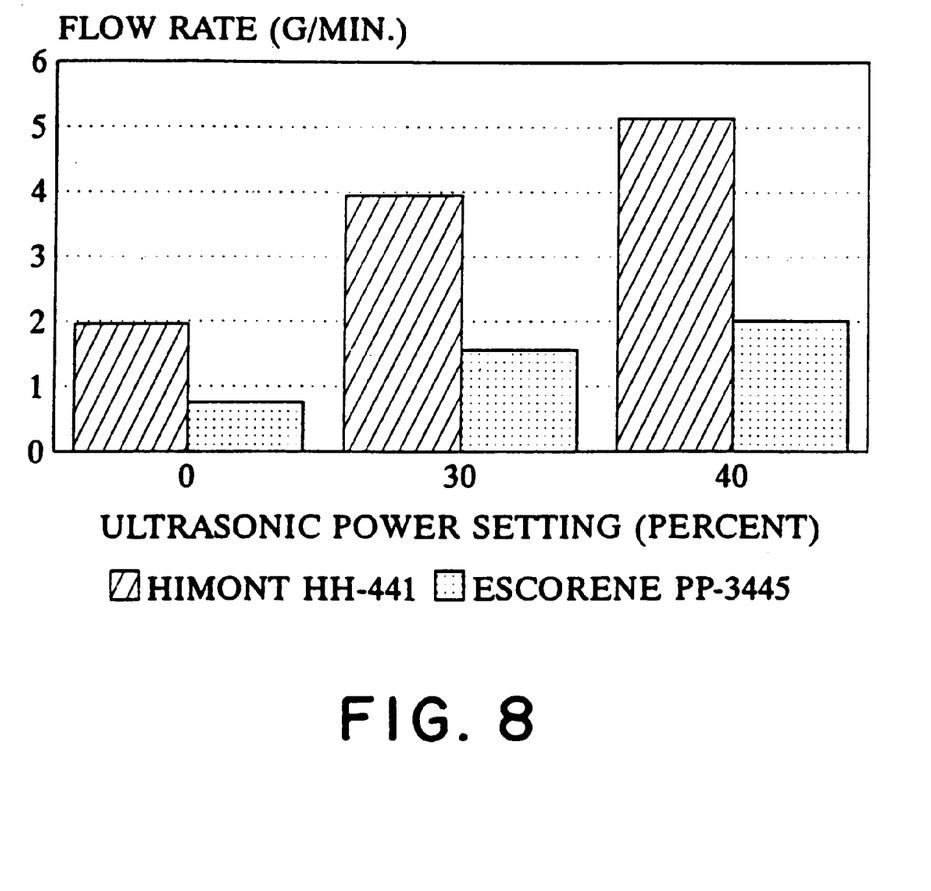

The data in Tables 2 and 3 suggest that the application of ultrasonic energy increases the polymer flow rate through the orifice, regardless of the temperature of the melt, compared to the flow rate without the application of ultrasonic energy. In order to better understand the data, however, the data were plotted as percent ultrasonic power setting versus the observed melt flow rate in grams per minute. The plot for Trials 1–9 (Table 2) is shown in FIG. 4 and the plot for Trials 10–18 (Table 2) is shown in FIG. 5. Similarly, the plots for Trials 19–30 and Trials 31–42 (Table 3) are shown in FIGS. 6 and 7, respectively. Finally, FIG. 8 is a similar plot of the data for Trials 1–3 from Table 2 and Trials 19–21 from Table 3.

FIGS. 4–7, FIGS. 6 and 7 in particular, suggest that increasing ultrasonic power results in essentially linear increases in the observed melt flow rate through the orifice. Moreover, such increases in melt flow rate occurred at each extrusion temperature studied. FIG. 8 demonstrates that the application of ultrasonic energy permits extrusion of a 30 melt flow rate polymer as though it were a 400 melt flow rate polymer without the application of ultrasonic energy. The implication is, of course, that the benefits of lower melt flow rate polymers (i.e., higher molecular weight polymers) can be realized under processing conditions typically employed for higher melt flow rate polymers. Such benefits include, by way of illustration only, the production of fibers having higher melting points and higher tensile strength characteristics. Conversely, the method of the present invention permits extruding a given polymer at a lower temperature without sacrificing throughput.

EXAMPLE 4

This example illustrates the ability of the apparatus of the present invention to remove obstructions which block the extrusion orifice. In this example, the Grid Melter hopper was filled with a quantity of an experimental pressure-sensitive hot melt adhesive, HL-1295 ZP, obtained from the H. B. Fuller Company of St. Paul, Minn. The recommended application temperature for the resin was 149° C. The heat zones in the melter, tubing, and die housing initially were set at 138° C. When heat levels stabilized, the pump drive was started at about 15 percent of total speed, and a pressure of 450 psig was developed. No ultrasonic power was used at this point. The temperature of all zones then was increased to approximately 194° C., or 27° C. above the recommended application temperature of the resin. The extrusion pressure stabilized at about 130 psig. The extrudate at this point smelled burned and was smoking. Within five minutes the flow stopped, and the extrusion pressure rose to over 400 psig. At this point the ultrasonic power controller was set to 50 percent and the power was turned on for one second. Flow immediately resumed and the pressure dropped to the former level. Particles of black charred materials could be seen in the extrudate. Within three minutes the flow stopped again and was restarted with an application of ultrasonic energy as before. This cycle was repeated eight more times. After each repetition the power control was turned down slightly; after the last cycle the power control setting was at 30 percent power, which resulted in a wattmeter reading of 35 watts. The power supply was left on at the 30 percent level and flow observed for one hour. Charred particles could be seen within the extrudate, but flow was uninterrupted for the course of the trial.

EXAMPLE 5

This example illustrates the present invention as it relates to relatively free-flowing liquids such as, for example, hydrocarbon based oils. The ultrasonic device utilized in this example is called an immersed horn. A detailed description of an exemplary immersed horn may be found in FIG. 1 and the portions of the specification referring to FIG. 1.

A pump, drive motor, and motor controller were obtained from the Dayton Electric Mfg. Company of Chicago, Ill. The pump was a hydraulic gear type with a displacement of 1.34 cubic centimeters per revolution. Piping on the high pressure side of the system was ¼" stainless steel tubing.

The capillary tip had an orifice opening of 0.0145 inch in diameter and a capillary length of 0.087 inch. Accordingly, the capillary had a length to diameter ratio (L/D) of 6. The opening on the tip opposite the capillary was 0.125 inch in diameter. The walls of the opening narrowed at an angle of 30 degrees until the opening was at the appropriate capillary diameter.

The ultrasonic device was powered by a Branson model 1120 power supply. Power consumed was monitored by a Branson A410A wattmeter. The 20 KHz ultrasonic signal was converted by a Branson model 502 converter. The output of the converter was coupled through an aluminum 1:1 booster to the ported horn. The converted, booster, and horn constituted the ultrasonic stack.

A Branson model J-4 power controller was installed to control the output of the power supply in percentage of total power capacity.

The oil chosen for the trials was a petroleum-based viscosity standard oil obtained from the Cannon Instrument Company of State College, Pa. standard number N1000, lot #92102. The oil had a viscosity at 20° C. of 4216 centipoise (cP) (SI units are mpa·s); a viscosity of 2716 cP; at 25° C.; a viscosity of 839 cP at 40° C.; a viscosity of 235 cP at 60° C.; and a viscosity of 40 cP at 100° C.

Flow rate trials were conducted on the immersed horn with the 0.0145 inch diameter tip either without ultrasonic power or at 50% of available power. The temperature of the extrudate was monitored by placing a bare junction thermocouple in the stream within ¼" of the exit, and reading the signal from the thermocouple with a hand-held pyrometer. Results of the trials are shown in Table 4. In Table 4, the "Pressure" column is the pressure in psig, the "Pump" column refers to the pulp speed in revolutions per minute, the "Mass" column refers to the mass of the test liquid (i.e., oil) collected and is expressed in grams, the "Temp." column identifies the temperature as read from the hand-held pyrometer, the "Time" column refers to the amount of time liquid was collected and is expressed in seconds, the "Watts" column refers to power consumption at a given power setting, and the "Rate" column refers to the flow rate measured for each trial, expressed in g/min.

TABLE 4

Flow Rates With 0.0145 Inch Tip at 0 and 50% Power

| Pressure | Pump | Mass | Temp. | Time | Watts | Rate |
|---|---|---|---|---|---|---|
| 120 | 2.9 | 1.82 | 67.8 | 30 | -0- | 3.64 |
| 140 | 3.6 | 2.07 | 67.4 | 30 | | 4.14 |
| 160 | 3.9 | 2.34 | 66.9 | 30 | | 4.68 |
| 180 | 4.3 | 2.55 | 66.3 | 30 | | 5.10 |
| 200 | 4.8 | 2.85 | 66.0 | 30 | | 5.70 |
| 220 | 5.2 | 3.07 | 65.6 | 30 | | 6.14 |
| 240 | 5.9 | 3.30 | 65.4 | 30 | | 6.60 |
| 260 | 6.2 | 3.49 | 65.1 | 30 | | 6.98 |
| 140 | 25.0 | 7.96 | 83.8 | 15 | 90.0 | 31.84 |
| 160 | 34.0 | 10.96 | 81.5 | 15 | 85.0 | 43.84 |
| 180 | 50.0 | 17.97 | 80.4 | 15 | 80.0 | 71.88 |
| 200 | 53.0 | 16.32 | 96.0 | 15 | 80.0 | 64.92 |
| 220 | 62.0 | 19.62 | 93.0 | 15 | 80.0 | 78.48 |

EXAMPLE 6

This example illustrates the present invention as it relates to producing a spray of liquid utilizing the same ultrasonic device (immersed horn) as Example 5 set up in the same configuration with the following exceptions:

Two different orifices were used. One had a diameter of 0.004 inch and a length of 0.004 inch (L/D ratio of 1) and the other had a diameter of 0.010 and a length of 0.006 inch (L/D ratio of 0.006/0.010 or 0.6).

The oil used was a vacuum pump oil having the designation HE-200, Catalog #98-198-006 available from Legbold-Heraeus Vacuum Products, Inc. of Export, Pennsylvania. The trade literature reported that the oil had a kinematic viscosity of 58.1 centipoise (cP) at 104° Fahrenheit and a kinematic viscosity of 9.14 cP at 212° Fahrenheit Flow rate trials were conducted on the immersed horn with the various tips without ultrasonic power, at 80 watts of power, and at 90 watts of power. Results of the trials are shown in Table 5. In Table 5, the "Pressure" column is the pressure in psig, the "TIP" column refers to the diameter and the length of the capillary tip (i.e., the exit orifice) in inches, the "Power" column refers to power consumption in watts at a given power setting, and the "Rate" column refers to the flow rate measured for each trial, expressed in g/min.

In every trial when the ultrasonic device was powered, the oil stream instantly atomized into a uniform, cone-shaped spray of fine droplets.

TABLE 5

Vacuum Pump Oil HE-200

| Pressure | TIP Diameter × Length (inches) | | Power | Rate |
|---|---|---|---|---|
| 150 | 0.004 | 0.004 | 0 | 11.8 |
| 150 | | | 80 | 12.6 |
| 150 | | | 90 | 16.08 |
| 250 | 0.004 | 0.004 | 0 | 13.32 |
| 250 | | | 80 | 14.52 |
| 250 | | | 90 | 17.16 |
| 150 | 0.010 | 0.006 | 0 | 20.76 |
| 150 | | | 80 | 22.08 |
| 150 | | | 90 | 25.80 |
| 250 | 0.10 | 0.006 | 0 | 24.00 |
| 250 | | | 80 | 28.24 |
| 250 | | | 90 | 31.28 |

EXAMPLE 7

This example illustrates the present invention utilizing the same ultrasonic device (immersed horn) as example 6 set up in the same configuration with the following exceptions:

Two different orifices were used. One had a diameter of 0.025 inch and a length of 0.045 inch (L/D ratio of 1.8) and the other had a diameter of 0.0145 and a length of 0.087 inch (L/D ratio of 6).

The liquid used was Karo brand light corn syrup, product manufacture code #214A5, available from Best Foods Division, CPC International, Englewood Cliffs, N.J. The corn syrup had a kinematic viscosity of 3392 cP at 25° Centigrade.

Flow rate trials were conducted on the immersed horn with the various tips without ultrasonic power, at 90 watts of power (20% of available power), and at 100 watts of power (30% of available power). Results of the trials are shown in Table 6. In Table 6, the "Pressure" column is the pressure in psig, the "Percent" column refers to the amount of power consumes as a percentage of available power, the "Watts" column refers to power consumption in watts at a given power setting, and the "Rate" column refers to the flow rate measured for each trial, expressed in g/min.

TABLE 6

Corn Syrup

| Pressure | POWER | | Rate |
|---|---|---|---|
| | Percent | Watts | |
| TIP - 0.025" Diameter × 0.045" Length | | | |
| 120 | — | 0 | 47.12 |
| | 20 | 90 | 81.88 |
| | 30 | 100 | 103.08 |
| 160 | — | 0 | 93.52 |
| | 20 | 90 | 139.72 |
| | 30 | 100 | 170.60 |
| TIP - 0.0145" Diameter × 0.087" Length | | | |
| 120 | — | 0 | 19.20 |
| | 20 | 90 | 37.80 |
| | 30 | 100 | 51.48 |
| 160 | — | 0 | 35.04 |
| | 20 | 90 | 59.84 |
| | 30 | 100 | 66.36 |

EXAMPLE 8

This example illustrates the present invention as it relates to the emulsification of disparate liquids. In this example, an emulsion was formed from water and a hydrocarbon-based oil. The oil chosen for the trials was a petroleum-based viscosity standard oil obtained from the Cannon Instrument Company of State College, Pa., standard number N1000, lot #92102.

The oil was pressurized and supplied by the pump, drive motor, and motor controller as described in Example 5. In this case the output from the pump was connected to one leg of a ¼" tee fitting. The opposite parallel leg of the tee fitting was connected to the entrance of a six element ½" diameter ISG Motionless Mixer obtained from Ross Engineering, Inc. of Savannah, Ga. The outlet of the mixer was connected to the inlet of the immersed horn ultrasonic device (See FIG. 1). Water was metered into the oil stream a by piston metering pump. The pump consisted of a ⁹⁄₁₆" diameter by 5" stroke hydraulic cylinder. The piston rod of the cylinder was advanced by a jacking screw driven by a variable speed motor through reduction gears. The speed of the motor was controlled utilizing a motor controller. The water was routed from the cylinder to the third leg of the tee by a flexible hose. The outlet end of the flexible hose was fitted with a length of stainless steel hypodermic tubing of about 0.030" inside diameter which, with the flexible hose installed to the tee, terminated in the approximate center of the oil flow stream (upstream of the ultrasonic device).

The immersed horn device was fitted with the 0.0145" diameter tip. The oil was pressurized to about 250 psig., creating a flow rate of about 35 g/min. The metering pump was set at about 3 rpm resulting in a water flow rate of 0.17 cc/min. Samples of the extrudate (i.e., the liquid output from the ultrasonic device) were taken with no ultrasonic power, and at about 100 watts ultrasonic power. The samples were examined with an optical microscope. The sample that passed through the ultrasonic device while it was unpowered contained widely dispersed water droplets ranging from about 50–300 micrometers in diameter. The sample that passed through the ultrasonic device while it received 100 watts of power (i.e., the ultrasonically treated sample) was an emulsion that contained a dense population of water droplets ranging from about 5 to less than 1 micrometer in diameter.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. An apparatus for increasing the flow rate of pressurized non-dilatant liquid through an orifice, the apparatus comprising:
    a die housing defining:
        a chamber adapted to receive a pressurized liquid;
        an inlet adapted to supply the chamber with the pressurized non-dilatant liquid; and
        an exit orifice defined by the walls of a die tip, the exit orifice being adapted to receive the pressurized non-dilatant liquid from the chamber and pass the liquid out of the die housing; and
    a means for applying ultrasonic energy to a portion of the pressurized non-dilatant liquid within the chamber without applying ultrasonic energy to the die tip, wherein the means for applying ultrasonic energy is located within the chamber.

2. The apparatus of claim 1, wherein the means for applying ultrasonic energy is an immersed ultrasonic horn.

3. The apparatus of claim 1, wherein the exit orifice is a plurality of exit orifices.

4. The apparatus of claim 1, wherein the exit orifice is a single exit orifice.

5. The apparatus of claim 1, wherein the exit orifice has a diameter of from about 0.0001 to about 0.1 inch.

6. The apparatus of claim 5, wherein the exit orifice has a diameter of from about 0.001 to about 0.01 inch.

7. The apparatus of claim 1, wherein the exit orifice is an exit capillary.

8. The apparatus of claim 7, wherein the exit capillary has a length to diameter ratio of from about 4:1 to about 10:1.

9. The apparatus of claim 1, wherein the ultrasonic energy has a frequency of from about 15 kHz to about 100 kHz.

10. The apparatus of claim 1, wherein the exit orifice is self-cleaning.

11. The apparatus of claim 1, wherein the apparatus is adapted to emulsify a pressurized multi-component liquid.

12. The apparatus of claim 1, wherein the apparatus is adapted to produce a spray of liquid.

13. The apparatus of claim 12, wherein the apparatus is adapted to produce an atomized spray of liquid.

14. The apparatus of claim 1, wherein the apparatus is adapted to produce cavitation of the pressurized liquid.

15. An apparatus for extruding a molten non-dilatant thermoplastic polymer, the apparatus comprising:
    a die housing defining:
        a chamber adapted to receive the molten non-dilatant thermoplastic polymer;
        an inlet orifice adapted to supply the chamber with the molten non-dilatant thermoplastic polymer; and
        an extrusion orifice adapted to receive the molten non-dilatant thermoplastic polymer from the chamber and extrude the polymer; and
    a means for applying ultrasonic energy to a portion of the molten non-dilatant thermoplastic polymer, wherein the means for applying ultrasonic energy is located within the chamber.

16. The apparatus of claim 15, in which the ultrasonic energy has a frequency of from about 15 kHz to about 100 kHz.

17. The apparatus as in claim 1, wherein the exit orifice includes an upstream cylindrical portion and a downstream frustum portion.

18. The apparatus as in claim 15, wherein the extrusion orifice includes an upstream cylindrical portion and a downstream frustum portion.

* * * * *